US012724383B2

(12) United States Patent
Smeeton et al.

(10) Patent No.: US 12,724,383 B2
(45) Date of Patent: Sep. 1, 2026

(54) PROJECTION ASSEMBLY

(71) Applicant: Dualitas Ltd, Milton Keynes (GB)

(72) Inventors: Timothy Smeeton, Milton Keynes (GB); Alexander Cole, Milton Keynes (GB); Rakesh Maharjan, Milton Keynes (GB)

(73) Assignee: Dualitas Ltd, Milton Keynes (GB)

( * ) Notice: Subject to any disclaimer, the term of this patent is extended or adjusted under 35 U.S.C. 154(b) by 289 days.

(21) Appl. No.: 18/351,218

(22) Filed: Jul. 12, 2023

(65) Prior Publication Data

US 2024/0045378 A1 Feb. 8, 2024

(30) Foreign Application Priority Data

Aug. 2, 2022 (GB) ..................................... 2211245

(51) Int. Cl.
*G03H 1/08* (2006.01)
*G02B 27/01* (2006.01)
*G03H 1/26* (2006.01)

(52) U.S. Cl.
CPC ....... *G03H 1/2645* (2013.01); *G02B 27/0103* (2013.01); *G03H 2223/16* (2013.01); *G03H 2223/50* (2013.01)

(58) Field of Classification Search
CPC ........ G02B 27/0103; G02B 2027/0123; G02B 27/0075; G02B 30/10; G03H 2223/16; G03H 2001/2242; G03H 2225/60; G03H 1/265; G03H 1/08
USPC ......................................... 359/25, 23, 13, 15
See application file for complete search history.

(56) References Cited

U.S. PATENT DOCUMENTS 5,663,815 A * 9/1997 Molteni ................. G03H 1/268 359/9
6,869,183 B2 * 3/2005 Liang ..................... G02B 30/26 353/69
8,982,472 B2 * 3/2015 Lvovskiy ............... G02B 27/30 359/632
9,291,821 B1 * 3/2016 Lvovskiy ........... G02B 27/0172
2012/0002256 A1 * 1/2012 Lacoste .................... G03H 1/22 359/489.08

FOREIGN PATENT DOCUMENTS

GB 2608667 A 1/2023

OTHER PUBLICATIONS

Extended European Search Report issued in EP 23185171.8 on Jan. 15, 2024 (11 pages).

(Continued)

*Primary Examiner* — Audrey Y Chang
(74) *Attorney, Agent, or Firm* — McDonnell Boehnen Hulbert & Berghoff LLP

(57) ABSTRACT

A projection assembly is described. The projection assembly comprises a first holographic projection channel configured to output a first holographic light field. The projection assembly further comprises a second holographic projection channel configured to output a second holographic light field. The first holographic projection channel and the second holographic projection channel are arranged such that the first holographic light field is adjoined with the second holographic light field in order to form a continuous field of view.

13 Claims, 11 Drawing Sheets

(56) References Cited

OTHER PUBLICATIONS

Zeng, Zhenxiang et al., "Full-color holographic display with increased-viewing-angle," Applied Optics, vol. 56, No. 13, Mar. 15, 2017, pp. F112-F120 (9 pages).
Sato, Kunihiro et al., "Reconstruction of color images of high quality by a holographic display," Proceedings of SPIE, Visual Communications and Image Processing 2005, D2 vol. 6136, Jan. 1, 2006, pp. 61360V-61360V-9 (9 pages).
Cheng, Dewen et al., "Design and manufacture AR head-mounted displays: A review and outlook," Light: Advanced Manufacturing, Jan. 1, 2021, pp. 350-369 (20 pages).
Search Report issued in GB 2211245.2 on Jan. 30, 2023 (4 pages).

* cited by examiner 409
405
404
H1
H8
B0
B1
B2
B3
B4
B5
B6
B7
B8
408
402
402'
400

622
605
604

I'
618
II
II'
616
608
904
612

I
614

620
603
610
600
602
606
z
x
y

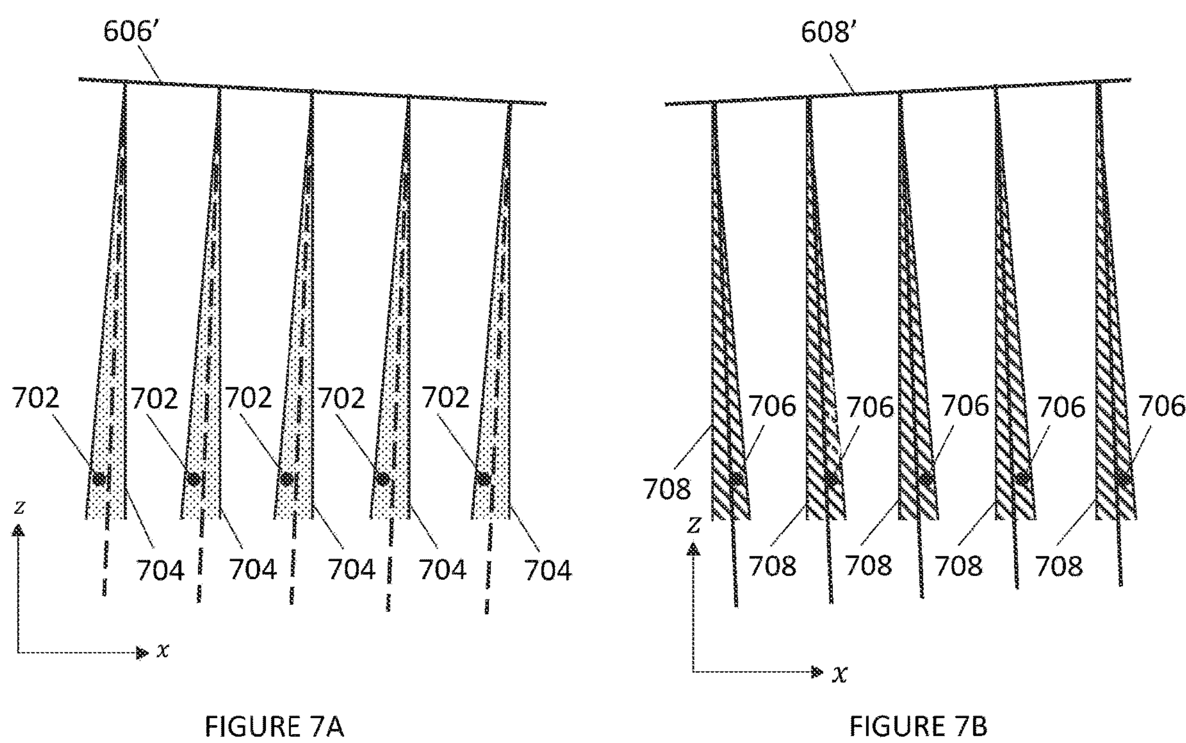
FIGURE 7A
FIGURE 7B
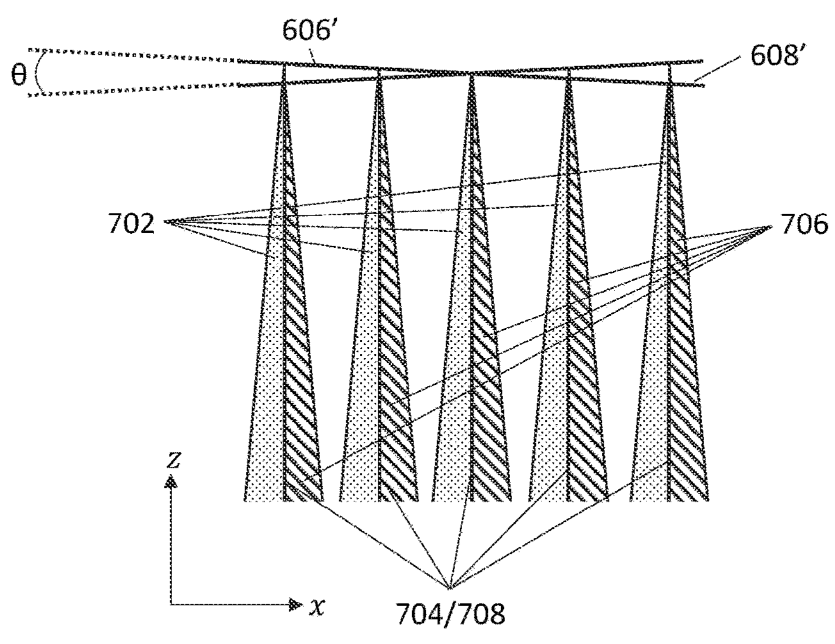
FIGURE 7C

PROJECTION ASSEMBLY

CROSS-REFERENCE TO RELATED APPLICATIONS

This application claims priority under 35 U.S.C. § 119 to UK Patent Application GB 2211245.2 titled "Projection Assembly," filed on Aug. 2, 2022, and currently pending. The entire contents of GB 2211245.2 are incorporated by reference herein for all purposes.

FIELD

The present disclosure relates to a light engine such as a holographic light engine. The present disclosure relates to holographic projectors and projection assemblies for outputting holographic light fields. More specifically, the present disclosure relates to compact holographic projectors having a large field of view. Some embodiments relate to picture generating units or hologram generating units for head-up displays. Other embodiments relate to head-up displays for vehicles.

INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator (SLM) arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD".

SUMMARY

Aspects of the present disclosure are defined in the appended independent claims.

In a first aspect, there is provided a projection assembly. The projection assembly comprises a first holographic projection channel configured to form a first holographic light field from a first hologram of a first image and a second holographic projection channel configured to form a second holographic light field from a second hologram of a second image. Each hologram is configured to form a holographic light field, e.g. when illuminated by a respective light source, in which the content, e.g. spatial content, of the corresponding image in a first dimension is encoded (in the hologram domain) by an angle such that angular channels of holographic light each correspond to a respective slice of the corresponding image in the first dimension. The projection assembly is further arranged to combine a first plurality of angular channels of the first holographic projection channel and a second plurality of angular channels of the second holographic projection channel in the first dimension. This combining is such that a viewer can receive the first holographic light field and second holographic light field and form therefrom an extended image comprising the first image adjoined to the second image. It may be said that the first holographic light field and second holographic light field are co-receivable (by a viewer). The word "co-receivable" is used herein to mean receivable together such as substantially at the same time. The extended image may comprise the first image positioned adjacent to and contiguous with the second image. When a viewer positioned at the eye-box receives the first holographic light field and the second holographic light field, the viewer sees an extended image formed from the first holographic light field and the second holographic light field. It may be said that the first holographic light field and second holographic light field are transformable into the extended image to reflect that a viewer or viewing system (more specifically, a lens thereof) transforms the holographic light field or wavefront from the hologram domain into a meaningful image in the spatial domain. The extended image comprises the first image adjoined to and contiguous with the second image. It may also be said that the first image and second image are merged. Advantageously, the projection assembly has an increased angular range/field of view.

The first holographic projection channel may comprise a first display device configured to display a first hologram corresponding to a first image. When the first display device is illuminated with a first light, the first light is spatially modulated in accordance with the displayed first hologram such that the first holographic projection channel outputs the first holographic light field. The first holographic light field may encode the first image. The second holographic projection channel may comprise a second display device configured to display a second hologram corresponding to a second image. When the second display device is illuminated with a second light, the second light is spatially modulated in accordance with the displayed second hologram such that the second holographic projection channel outputs the second holographic light field. The second holographic light field may encode the second image. The first display device and the second display device may be tilted with respect to one another such that a first propagation direction of the first holographic light field diverges from a second propagation direction of the second holographic light field. The first display device and the second display device may be tilted with respect to one another at a tilt angle that is substantially equal to the sum of diffraction angles of the adjoined first and second holographic light fields. The tilt may be a rotation about a second dimension (e.g. y-axis) perpendicular to a first dimension (e.g. x-axis) such that the first and second holographic light fields are adjoined in the first dimension. For example, the first display device and second display device are tilted relative to each other in a plane defined by the x-axis and the z-axis, such that the first and second holographic light fields are adjoined along the x-axis.

An angular field of view of the projection system in a first principle dimension may be equal to the sum of an angular field of view of the first holographic light field in the first principle dimension and an angular field of view of the second holographic light field in the first principle dimension. The angular field of view of the projection assembly in a second dimension is substantially equal to the angular field of view of the first holographic light field in the second dimension and/or the angular field of view of the second holographic light field in the second dimension. The second dimension may be perpendicular to the first dimension. The angular field of view of the first holographic light field and the angular field of view of the second holographic light field may be the same as each other or different to each other. The angular field of view of the projection system may be considered to the angular field of view of the adjoined first and second holographic light fields. The first holographic light field may have a first field of view. The second holographic light field may have a second field of view. The adjoined first and second holographic light fields may have a third field of view. The third angular field of view in a first dimension may be substantially equal to the sum of the first and second angular fields of view in the first dimension. The third field of view in a second dimension may be substantially equal to the first field of view in the second dimension and/or the second field of view in the second dimension. The second dimension may be perpendicular to the first dimension.

The first holographic projection channel may comprise a first light source for forming the first holographic light field by illuminating the first hologram. The second holographic projection channel may comprise a second light source for forming the second holographic light field by illuminating the second hologram. The first light source may be different to the second light source. Advantageously, there tends to be little or no coherent interference between the two holographic light fields if two different light sources are used even when the specifications are similar.

The projection assembly may be arranged to form two or more multiplexed channels. Each multiplex channel may comprise a portion of the first holographic light field adjoined with a portion of the second holographic light field. Advantageously, each of the multiplexed channels can be used as an input of a respective waveguide or pupil expander. The multiplexed channels may be substantially parallel to each other. The multiplexed channels may be spatially offset from each other in two perpendicular directions. The two perpendicular directions may be the first and second dimensions. The projection assembly may further comprise a plurality of waveguides. Each waveguide may be arranged to receive a respective one of the multiplexed channels. A first waveguide of the plurality of waveguides may be configured to replicate light fields in a first direction. The first direction may be in the first dimension. A second waveguide of the plurality of waveguides may be configured to replicate light fields in a second direction opposite to the first direction. The second direction may be in the first dimension.

The projection assembly may further comprise a beam combiner configured to receive the first holographic light field and the second holographic light field and to output the two multiplexed channels. The beam combiner may comprise a beam splitter arranged to receive the first holographic light field on a first side thereof and the second holographic light field on a second side thereof. The beam splitter may comprise a transmissive-reflective element arranged to transmit a first portion of light incident thereon and reflect a second portion of light incident thereon. The beam splitter may be configured to: split the first holographic light field into a first transmitted light field and a first reflected light field; split the second holographic light field into a second transmitted light field and a second reflected light field; merge or combine the first transmitted light field with the second reflected light field thereby forming a first multiplexed channel of the two or more multiplexed channels; and merge or combine the first reflected light field with the second transmitted light field thereby forming a second multiplexed channel of the two or more multiplexed channels. The first and second multiplexed channels may be identical to each other. A path propagated by the first transmitted light field may be the same as a path propagated by the second reflected light field thereby forming one of the multiplexed channels, and/or a path propagated by the first reflected light field may be the same as a path propagated by the second transmitted light field. Advantageously, the use of the beam splitter tends to reduce or eliminate light loss from the projection system. This is because both of the multiplexed channels are used as inputs for respective waveguides. Another advantage is that seamless merging of the first and second holographic light fields tends to be achievable. This is due to the use of a continuous component (i.e. the reflective and transmissive element in the beam splitter) which tends to avoid the formation of discontinuities in the image which may be present if the light fields are combined using sharp-edged mirrors. The beam splitter tends to enable the seamless merging of light fields from two display devices (for angular range extension) with high efficiency for a dual-rod pupil expander.

The first and second holographic projection channels may each comprise a respective optical relay configured to form an intermediate image of the respective holographic light field. Each optical relay may change a diffraction angle of the respective holographic light field. Using optical relays to demagnify the holographic light fields before adjoining the holographic light fields means that a high field of view, "FOV", tends to be achieved without any ghost images. Each intermediate image of the respective holographic light fields may have a dimension greater than 5 mm, such as greater than 7 mm or 10 mm.

In a further aspect, there is provided a projection assembly comprising a first holographic projection channel configured to output a first holographic light field and a second holographic projection channel configured to output a second holographic light field. The first holographic projection channel and the second holographic projection channel are arranged such that the first holographic light field is adjoined with the second holographic light field in order to form a continuous field of view. The combination of the first holographic light field and the second holographic light field, which are adjoining, may be considered a third holographic light field.

In the present disclosure, the term "replica" is used herein with respect to waveguides such as waveguide pupil expanders to reflect that spatially modulated light is divided such that a complex light field is directed along a plurality of different optical paths. The word "replica" is used to refer to each occurrence or instance of the complex light field after a replication event—such as a partial reflection-transmission by a pupil expander. Each replica travels along a different optical path. Some embodiments of the present disclosure relate to propagation of light that is encoded with a hologram, not an image—i.e., light that is spatially modulated with a hologram of an image, not the image itself. It may therefore be said that a plurality of replicas of the hologram are formed. The person skilled in the art of holography will appreciate that the complex light field associated with propagation of light encoded with a hologram will change with propagation distance. Use herein of the term "replica" is independent of propagation distance and so the two branches or paths of light associated with a replication event are still referred to as "replicas" of each other even if the branches are a different length, such that the complex light field has evolved differently along each path. That is, two complex light fields are still considered "replicas" in accordance with this disclosure even if they are associated with different propagation distances—providing they have arisen from the same replication event or series of replication events.

A "diffracted light field" or "diffractive light field" in accordance with this disclosure is a light field formed by diffraction. A diffracted light field may be formed by illuminating a corresponding diffractive pattern. In accordance with this disclosure, an example of a diffractive pattern is a hologram and an example of a diffracted light field is a holographic light field or a light field forming a holographic reconstruction of an image. The holographic light field forms a (holographic) reconstruction of an image on a replay plane. The holographic light field that propagates from the hologram to the replay plane may be said to comprise light encoded with the hologram or light in the hologram domain. A diffracted light field is characterized by a diffraction angle determined by the smallest feature size of the diffractive structure and the wavelength of the light (of the diffracted light field). In accordance with this disclosure, it may also be said that a "diffracted light field" is a light field that forms a reconstruction on a plane spatially separated from the corresponding diffractive structure. An optical system is disclosed herein for propagating a diffracted light field from a diffractive structure to a viewer. The diffracted light field may form an image.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The term "eye-box" or "eye motion box" is a well-known term of the art that is typically defined as an area or volume of space (remote from the display device) within which a viewable image, formed by a display system, may be viewable or visible to a viewing system or viewer. The viewable image may be a virtual image.

The "field of view" of a display system can be considered to be the size or extent of the image, formed by the display system, that is seen by a viewing system or viewer positioned within the eye-box of the display system. The size of the image is typically defined in angular space by the angular range over which the image extends as seen by the viewer from the eye-box. The angular range may be defined within respect to a central axis, such as a projection axis. The field of view may be defined in two perpendicular directions. For example, the horizontal angular field of view may be −10 degrees to +10 degrees and the vertical angular field of view may be −5 degrees to +5 degrees. In some embodiments, the field of view is defined from the centre of the eye-box. In some embodiments, the field of view is substantially the same from all positions within the eye-box.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level"

may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures:

FIG. 7A shows a schematic illustration (not to scale) of first light ray bundles from a first display device forming an image of the first display device;

FIG. 7B shows a schematic illustration (not to scale) of second light ray bundles from a second display device forming an image of the second display device;

FIG. 7C shows a schematic illustration (not to scale) of a superposition of the images of the first and second display devices;

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

In the present disclosure, the term "substantially" when applied to a structural units of an apparatus may be interpreted as the technical feature of the structural units being produced within the technical tolerance of the method used to manufacture it.

Conventional Optical Configuration for Holographic Projection

Figure 1:
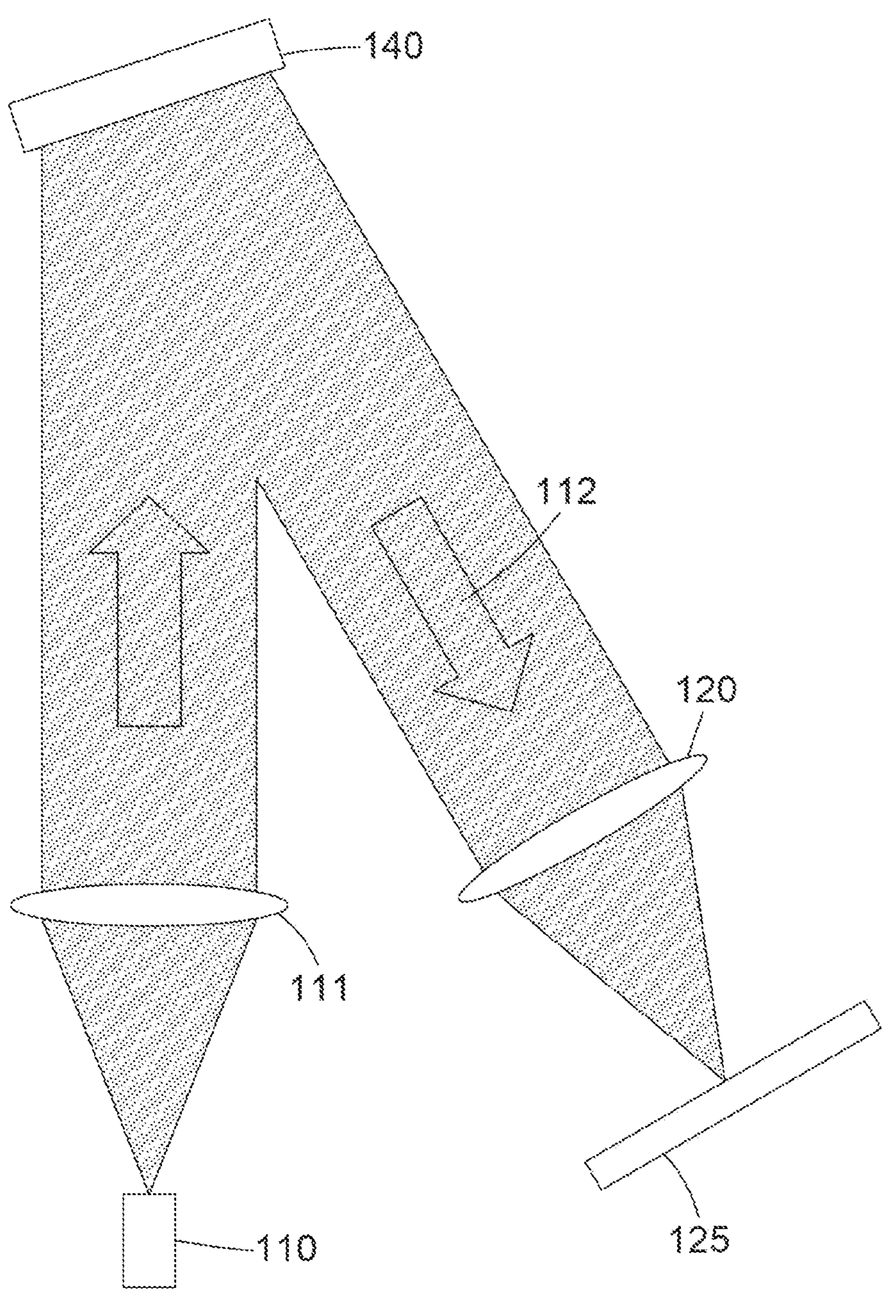
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform. In some embodiments of the present disclosure, the lens of the viewer's eye performs the hologram to image transformation.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms. Embodiments relate to Fourier holography and Gerchberg-Saxton type algorithms by way of example only. The present disclosure is equally applicable to Fresnel holography and Fresnel holograms which may be calculated by a similar method. In some embodiments, the hologram is a phase or phase-only hologram. However, the present disclosure is also applicable to holograms calculated by other techniques such as those based on point cloud methods.

In some embodiments, the hologram engine is arranged to exclude from the hologram calculation the contribution of light blocked by a limiting aperture of the display system. British patent application 2101666.2, filed 5 Feb. 2021 and incorporated herein by reference, discloses a first hologram calculation method in which eye-tracking and ray tracing are used to identify a sub-area of the display device for calculation of a point cloud hologram which eliminates ghost images. The sub-area of the display device corresponds with the aperture, of the present disclosure, and is used exclude light paths from the hologram calculation. British patent application 2112213.0, filed 26 Aug. 2021 and incorporated herein by reference, discloses a second method based on a modified Gerchberg-Saxton type algorithm which includes steps of light field cropping in accordance with pupils of the optical system during hologram calculation. The cropping of the light field corresponds with the determination of a limiting aperture of the present disclosure. British patent application GB2118911.3, filed 23 Dec. 2021 and also incorporated herein by reference, discloses a third method of calculating a hologram which includes a step of determining a region of a so-called extended modulator formed by a hologram replicator. The region of the extended modulator is also an aperture in accordance with this disclosure.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Large Eye-Box Using Small Display Device

Broadly, the present disclosure relates to image projection. It relates to a method of image projection and an image projector which comprises a display device. The present disclosure also relates to a projection system comprising the image projector and a viewing system, in which the image projector projects or relays light from the display device to the viewing system. The present disclosure is equally applicable to a monocular and binocular viewing system. The viewing system may comprise a viewer's eye or eyes. The viewing system comprises an optical element having optical power (e.g., lens/es of the human eye) and a viewing plane (e.g., retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. In other examples, the image is a real image formed by holographic reconstruction and the image is projected or relayed to the viewing plane. In these other examples, spatially modulated light of an intermediate holographic reconstruction formed either in free space or on a screen or other light receiving surface between the display device and the viewer, is propagated to the viewer. In both cases, an image is formed by illuminating a diffractive pattern (e.g., hologram or kinoform) displayed on the display device.

The display device comprises pixels. The pixels of the display may display a diffractive pattern or structure that diffracts light. The diffracted light may form an image at a plane spatially separated from the display device. In accordance with well-understood optics, the magnitude of the maximum diffraction angle is determined by the size of the pixels and other factors such as the wavelength of the light.

In embodiments, the display device is a spatial light modulator such as liquid crystal on silicon ("LCOS") spatial light modulator (SLM). Light propagates over a range of diffraction angles (for example, from zero to the maximum diffractive angle) from the LCOS, towards a viewing entity/system such as a camera or an eye. In some embodiments, magnification techniques may be used to increase the range of available diffraction angles beyond the conventional maximum diffraction angle of an LCOS.

In some embodiments, the (light of a) hologram itself is propagated to the eyes. For example, spatially modulated light of the hologram (that has not yet been fully transformed to a holographic reconstruction, i.e. image)—that may be informally said to be "encoded" with/by the hologram—is propagated directly to the viewer's eyes. A real or virtual image may be perceived by the viewer. In these embodiments, there is no intermediate holographic reconstruction/image formed between the display device and the viewer. It is sometimes said that, in these embodiments, the lens of the eye performs a hologram-to-image conversion or transform. The projection system, or light engine, may be configured so that the viewer effectively looks directly at the display device.

Reference is made herein to a "light field" which is a "complex light field". The term "light field" merely indicates a pattern of light having a finite size in at least two orthogonal spatial directions, e.g. x and y. The word "complex" is used herein merely to indicate that the light at each point in the light field may be defined by an amplitude value and a phase value, and may therefore be represented by a complex number or a pair of values. For the purpose of hologram calculation, the complex light field may be a two-dimensional array of complex numbers, wherein the complex numbers define the light intensity and phase at a plurality of discrete locations within the light field. As such, a "holographic light field" can be considered to be a light field that is used to form the final image seen by a viewer.

In accordance with the principles of well-understood optics, the range of angles of light propagating from a display device that can be viewed, by an eye or other viewing entity/system, varies with the distance between the display device and the viewing entity. At a 1 metre viewing distance, for example, only a small range of angles from an LCOS can propagate through an eye's pupil to form an image at the retina for a given eye position. The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g., any one eye position within a viewing window such as eye-box.)

In some embodiments, the image perceived by a viewer is a virtual image that appears upstream of the display device—that is, the viewer perceives the image as being further away from them than the display device. Conceptually, it may therefore be considered that the viewer is looking at a virtual image through a 'display device-sized window', which may be very small, for example 1 cm in diameter, at a relatively large distance, e.g., 1 metre. And the user will be viewing the display device-sized window via the pupil(s) of their eye(s), which can also be very small. Accordingly, the field of view becomes small and the specific angular range that can be seen depends heavily on the eye position, at any given time.

A pupil expander addresses the problem of how to increase the range of angles of light rays that are propagated from the display device that can successfully propagate through an eye's pupil to form an image. The display device is generally (in relative terms) small and the projection distance is (in relative terms) large. In some embodiments, the projection distance is at least one—such as, at least two—orders of magnitude greater than the diameter, or width, of the entrance pupil and/or aperture of the display device (i.e., size of the array of pixels).

Use of a pupil expander increases the viewing area (i.e., user's eye-box) laterally, thus enabling some movement of the eye/s to occur, whilst still enabling the user to see the image. As the skilled person will appreciate, in an imaging system, the viewing area (user's eye box) is the area in which a viewer's eyes can perceive the image. The present disclosure encompasses non-infinite virtual image distances—that is, near-field virtual images.

Conventionally, a two-dimensional pupil expander comprises one or more one-dimensional optical waveguides each formed using a pair of opposing reflective surfaces, in which the output light from a surface forms a viewing window or eye-box. Light received from the display device (e.g., spatially modulated light from a LCOS) is replicated by the or each waveguide so as to increase the field of view (or viewing area) in at least one dimension. In particular, the waveguide enlarges the viewing window due to the generation of extra rays or "replicas" by division of amplitude of the incident wavefront.

The display device may have an active or display area having a first dimension that may be less than 10 cm such as less than 5 cm or less than 2 cm. The propagation distance between the display device and viewing system may be greater than 1 m such as greater than 1.5 m or greater than 2 m. The optical propagation distance within the waveguide may be up to 2 m such as up to 1.5 m or up to 1 m. The method may be capable of receiving an image and determining a corresponding hologram of sufficient quality in less than 20 ms such as less than 15 ms or less than 10 ms.

In some embodiments—described only by way of example of a diffracted or holographic light field in accordance with this disclosure—a hologram is configured to route light into a plurality of channels, each channel corresponding to a different part (i.e. sub-area) of an image. The channels formed by the diffractive structure are referred to herein as "hologram channels" merely to reflect that they are channels of light encoded by the hologram with image information. It may be said that the light of each channel is in the hologram domain rather than the image or spatial domain. In some embodiments, the hologram is a Fourier or Fourier transform hologram and the hologram domain is therefore the Fourier or frequency domain. The hologram may equally be a Fresnel or Fresnel transform hologram. The hologram may also be a point cloud hologram. The hologram is described herein as routing light into a plurality of hologram channels to reflect that the image that can be reconstructed from the hologram has a finite size and can be arbitrarily divided into a plurality of image sub-areas, wherein each hologram channel would correspond to each image sub-area. Importantly, the hologram of this example is characterised by how it distributes the image content when illuminated. Specifically and uniquely, the hologram divides the image content by angle. That is, each point on the image is associated with a unique light ray angle in the spatially modulated light formed by the hologram when illuminated—at least, a unique pair of angles because the hologram is two-dimensional. For the avoidance of doubt, this hologram behaviour is not conventional. The spatially modulated light formed by this special type of hologram, when illuminated, may be divided into a plurality of hologram channels, wherein each hologram channel is defined by a range of light ray angles (in two-dimensions). It will be understood from the foregoing that any hologram channel (i.e. sub-range of light ray angles) that may be considered in the spatially modulated light will be associated with a respective part or sub-area of the image. That is, all the information needed to reconstruct that part or sub-area of the image is contained within a sub-range of angles of the spatially modulated light formed from the hologram of the image. When the spatially modulated light is observed as a whole, there is not necessarily any evidence of a plurality of discrete light channels.

Nevertheless, the hologram may still be identified. For example, if only a continuous part or sub-area of the spatially modulated light formed by the hologram is reconstructed, only a sub-area of the image should be visible. If a different, continuous part or sub-area of the spatially modulated light is reconstructed, a different sub-area of the image should be visible. A further identifying feature of this type of hologram is that the shape of the cross-sectional area of any hologram channel substantially corresponds to (i.e. is substantially the same as) the shape of the entrance pupil although the size may be different—at least, at the correct plane for which the hologram was calculated. Each light/hologram channel propagates from the hologram at a different angle or range of angles. Whilst these are example ways of characterising or identifying this type of hologram, other ways may be used. In summary, the hologram disclosed herein is characterised and identifiable by how the image content is distributed within light encoded by the hologram. Again, for the avoidance of any doubt, reference herein to a hologram configured to direct light or angularly-divide an image into a plurality of hologram channels is made by way of example only and the present disclosure is equally applicable to pupil expansion of any type of holographic light field or even any type of diffractive or diffracted light field.

The system can be provided in a compact and streamlined physical form. This enables the system to be suitable for a broad range of real-world applications, including those for which space is limited and real-estate value is high. For example, it may be implemented in a head-up display (HUD) such as a vehicle or automotive HUD.

In accordance with the present disclosure, pupil expansion is provided for diffracted or diffractive light, which may comprise diverging ray bundles. The diffracted light field may be defined by a "light cone". Thus, the size of the diffracted light field (as defined on a two-dimensional plane) increases with propagation distance from the corresponding diffractive structure (i.e. display device). It can be said that the pupil expander/s replicate the hologram or form at least one replica of the hologram, to convey that the light delivered to the viewer is spatially modulated in accordance with a hologram.

In some embodiments, two one-dimensional waveguide pupil expanders are provided, each one-dimensional waveguide pupil expander being arranged to effectively increase the size of the exit pupil of the system by forming a plurality of replicas or copies of the exit pupil (or light of the exit pupil) of the spatial light modulator. The exit pupil may be understood to be the physical area from which light is output by the system. It may also be said that each waveguide pupil expander is arranged to expand the size of the exit pupil of the system. It may also be said that each waveguide pupil expander is arranged to expand/increase the size of the eye box within which a viewer's eye can be located, in order to see/receive light that is output by the system.

Light Channeling

The hologram formed in accordance with some embodiments, angularly-divides the image content to provide a plurality of hologram channels which may have a cross-sectional shape defined by an aperture of the optical system. The hologram is calculated to provide this channeling of the diffracted light field. In some embodiments, this is achieved during hologram calculation by considering an aperture (virtual or real) of the optical system, as described above.

Figure 2:
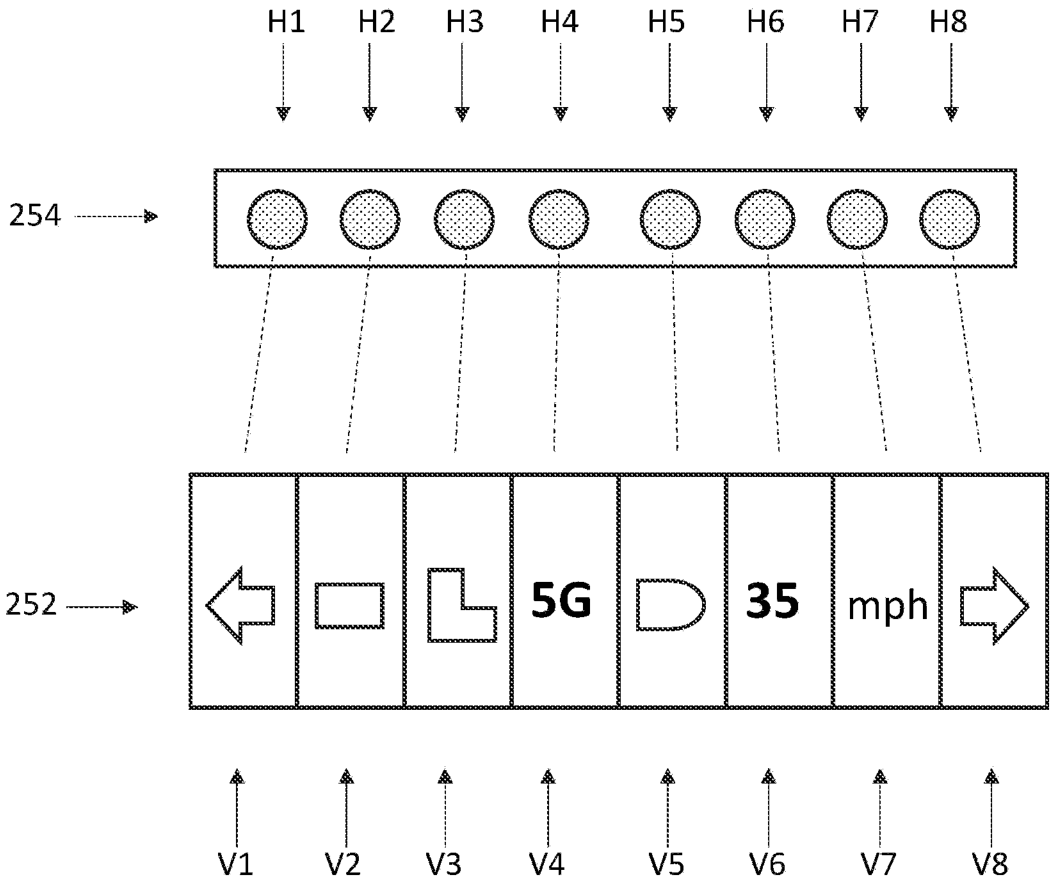
FIG. 2 shows an image for projection comprising eight image areas/components, V1 to V8, and cross-sections of the corresponding hologram channels, H1-H8.
Figure 3:
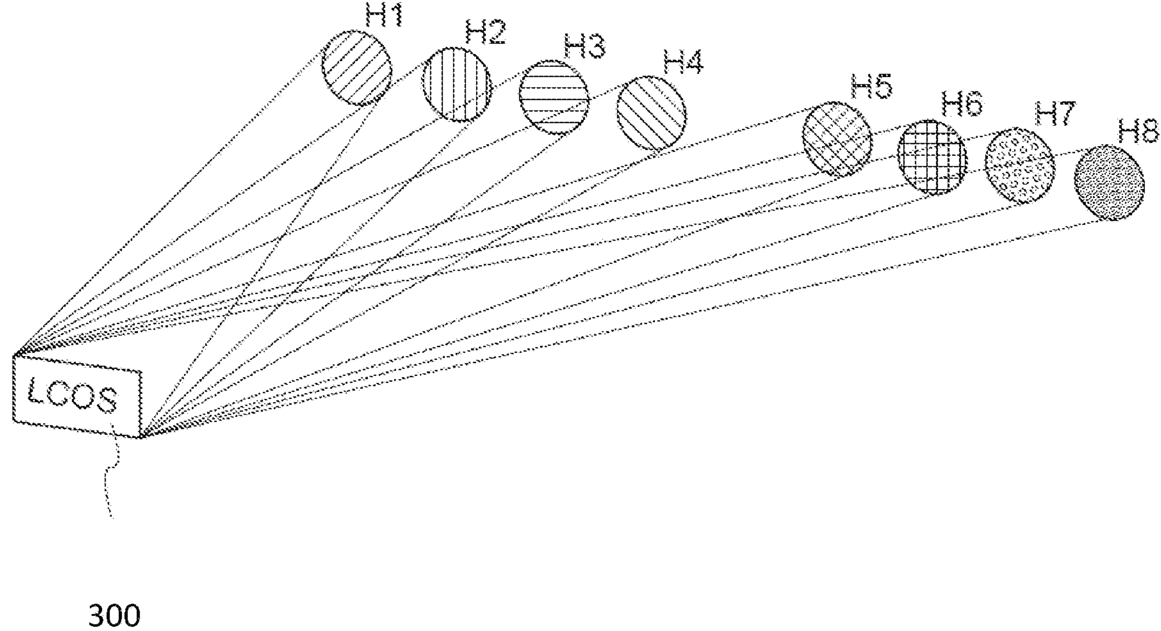
FIG. 3 shows a hologram displayed on an LCOS that directs light into a plurality of discrete areas.

FIGS. 2 and 3 show an example of this type of hologram that may be used in conjunction with a pupil expander as disclosed herein. However, this example should not be regarded as limiting with respect to the present disclosure.

FIG. 2 shows an image 252 for projection comprising eight image areas/components, V1 to V8. FIG. 2 shows eight image components by way of example only and the image 252 may be divided into any number of components. FIG. 2 also shows an encoded light pattern 254 (i.e., hologram) that can reconstruct the image 252—e.g., when transformed by the lens of a suitable viewing system. The encoded light pattern 254 comprises first to eighth sub-holograms or components, H1 to H8, corresponding to the first to eighth image components/areas, V1 to V8. FIG. 2 further shows how a hologram may decompose the image content by angle. The hologram may therefore be characterised by the channeling of light that it performs. This is illustrated in FIG. 3. Specifically, the hologram in this example directs light into a plurality of discrete areas. The discrete areas are discs in the example shown but other shapes are envisaged. The size and shape of the optimum disc may, after propagation through the waveguide, be related to the size and shape of an aperture of the optical system such as the entrance pupil of the viewing system.

Figure 4:
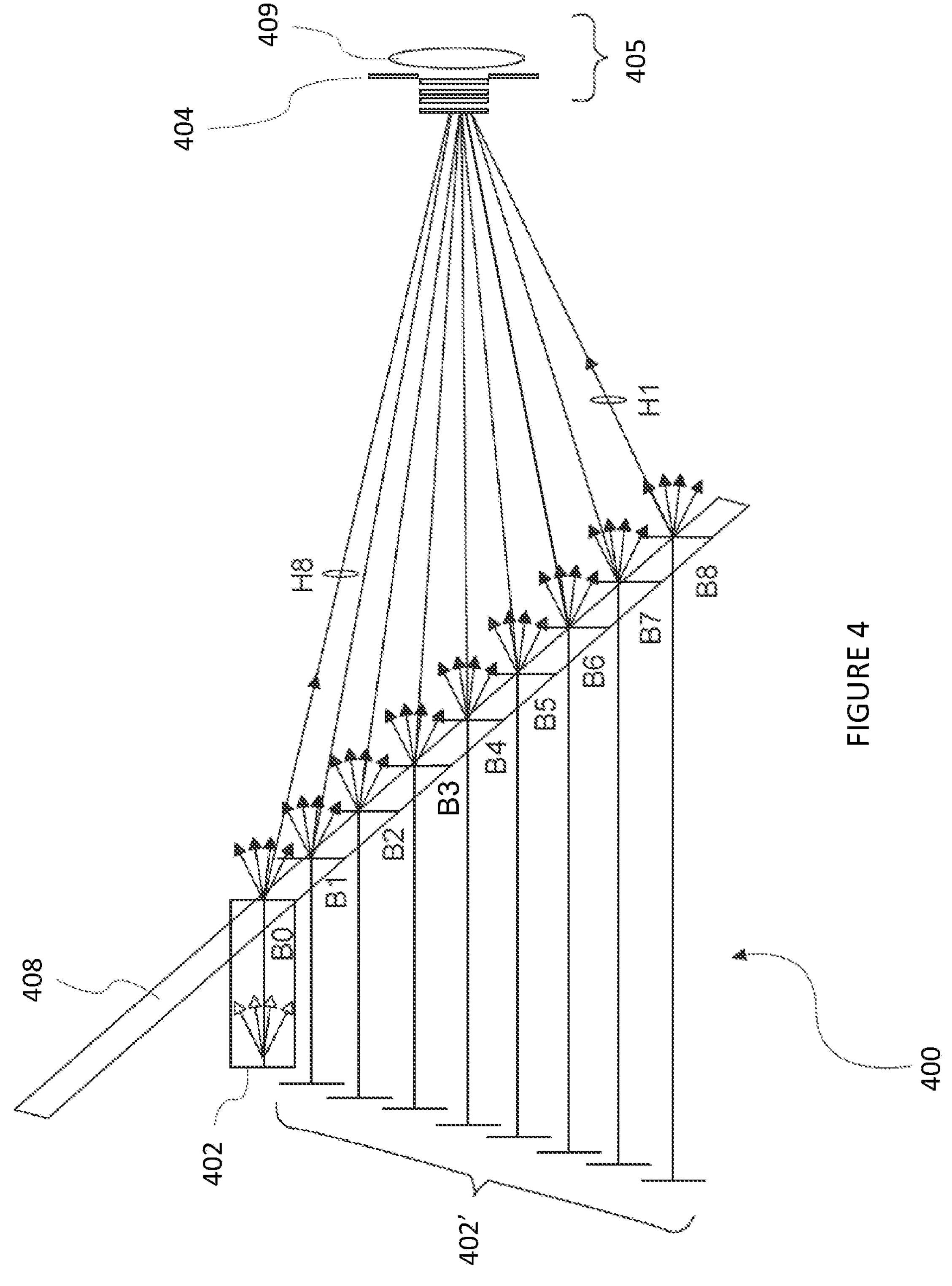
FIG. 4 shows a system, including a display device that displays a hologram that has been calculated as illustrated in FIGS. 2 and 3.

FIG. 4 shows a system 400, including a display device that displays a hologram that has been calculated as illustrated in FIGS. 2 and 3.

The system 400 comprises a display device, which in this arrangement comprises an LCOS 402. The LCOS 402 is arranged to display a modulation pattern (or 'diffractive pattern') comprising the hologram and to project light that has been holographically encoded towards an eye 405 that comprises a pupil that acts as an aperture 404, a lens 409, and a retina (not shown) that acts as a viewing plane. There is a light source (not shown) arranged to illuminate the LCOS 402. The lens 409 of the eye 405 performs a hologram-to-image transformation. The light source may be of any suitable type. For example, it may comprise a laser light source.

The viewing system 400 further comprises a waveguide 408 positioned between the LCOS 402 and the eye 405. The presence of the waveguide 408 enables all angular content from the LCOS 402 to be received by the eye, even at the relatively large projection distance shown. This is because the waveguide 408 acts as a pupil expander, in a manner that is well known and so is described only briefly herein.

In brief, the waveguide 408 shown in FIG. 4 comprises a substantially elongate formation. In this example, the waveguide 408 comprises an optical slab of refractive material, but other types of waveguide are also well known and may be used. The waveguide 408 is located so as to intersect the light cone (i.e., the diffracted light field) that is projected from the LCOS 402, for example at an oblique angle. In this example, the size, location, and position of the waveguide 408 are configured to ensure that light from each of the eight ray bundles, within the light cone, enters the waveguide 408. Light from the light cone enters the waveguide 408 via its first planar surface (located nearest the LCOS 402) and is guided at least partially along the length of the waveguide 408, before being emitted via its second planar surface, substantially opposite the first surface (located nearest the eye). As will be well understood, the second planar surface is partially reflective, partially transmissive. In other words, when each ray of light travels within the waveguide 408 from the first planar surface and hits the second planar surface, some of the light will be transmitted out of the waveguide 408 and some will be reflected by the second planar surface, back towards the first planar surface. The first planar surface is reflective, such that all light that hits it, from within the waveguide 408, will be reflected back towards the second planar surface. Therefore, some of the light may simply be refracted between the two planar surfaces of the waveguide 408 before being transmitted, whilst other light may be reflected, and thus may undergo one or more reflections, (or 'bounces') between the planar surfaces of the waveguide 408, before being transmitted.

FIG. 4 shows a total of nine "bounce" points, B0 to B8, along the length of the waveguide 408. Each of the "bounce" points B1 to B8 corresponds to a respective LCOS 402'. Although light relating to all points of the image (V1-V8) as shown in FIG. 2 is transmitted out of the waveguide at each "bounce" from the second planar surface of the waveguide 408, only the light from one angular part of the image (e.g. light of one of V1 to V8) has a trajectory that enables it to reach the eye 405, from each respective "bounce" point, B0 to B8. Moreover, light from a different angular part of the image, V1 to V8, reaches the eye 405 from each respective "bounce" point. Therefore, each angular channel of encoded light reaches the eye only once, from the waveguide 408, in the example of FIG. 4.

Although virtual images, which require the eye to transform received modulated light in order to form a perceived image, have generally been discussed herein, the methods and arrangements described herein can be applied to real images.

Two-Dimensional Pupil Expansion—Example 1

Whilst the arrangement shown in FIG. 4 includes a single waveguide that provides pupil expansion in one dimension, pupil expansion can be provided in more than one dimension, for example in two dimensions. Moreover, whilst the example in FIG. 4 uses a hologram that has been calculated to create channels of light, each corresponding to a different portion of an image, the present disclosure and the systems that are described herebelow are not limited to such a hologram type.

Figure 5:
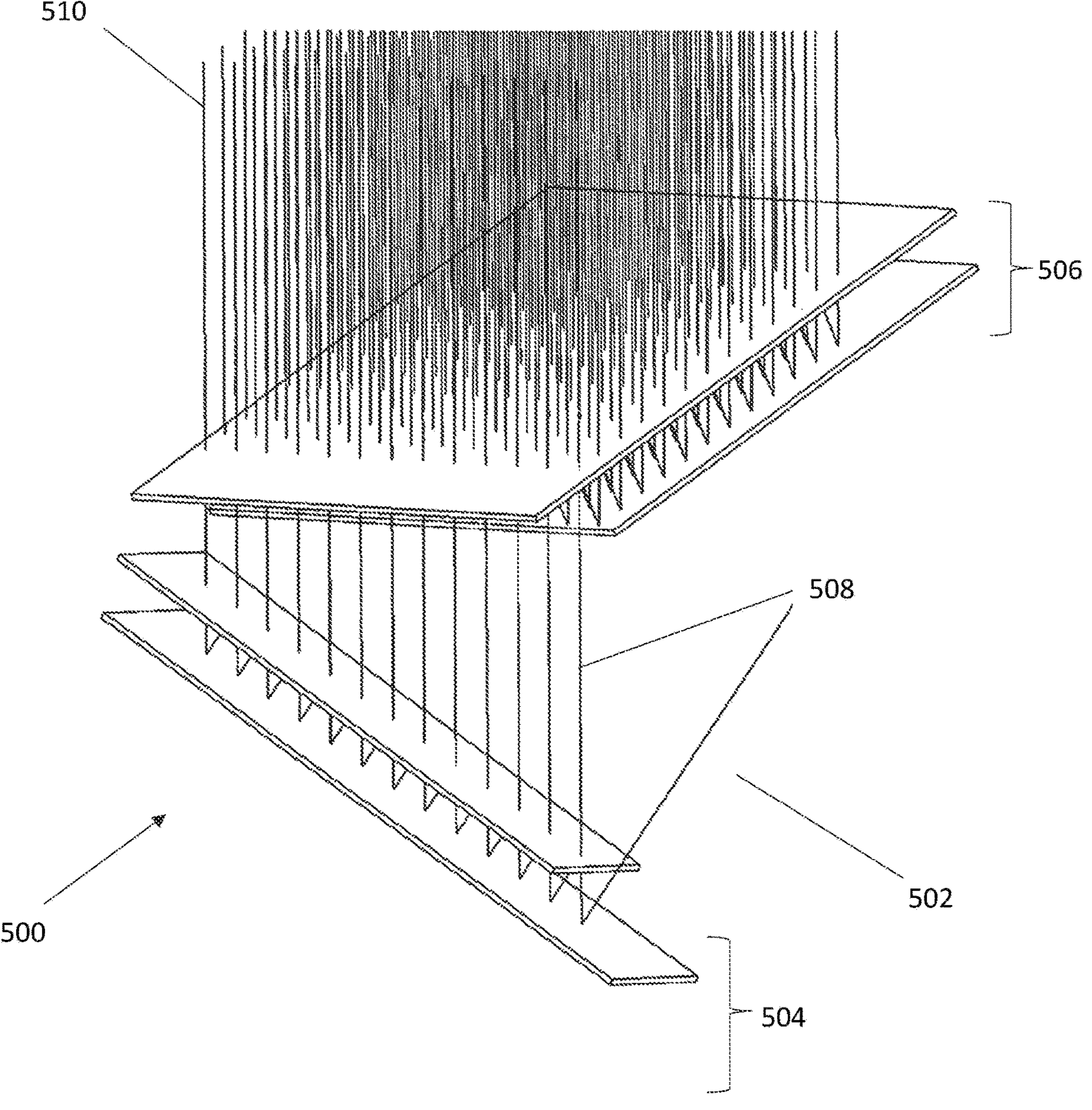
FIG. 5 shows a perspective view of a first example two-dimensional pupil expander comprising two replicators.

FIG. 5 shows a perspective view of a system 500 comprising two replicators, 504, 506 arranged for expanding a light beam 502 in two dimensions.

In the system 500 of FIG. 5, the first replicator 504 comprises a first pair of surfaces, stacked parallel to one another, and arranged to provide replication—or, pupil expansion—in a similar manner to the waveguide 408 of FIG. 4. The first pair of surfaces are similarly (in some cases, identically) sized and shaped to one another and are substantially elongate in one direction. The collimated light beam 502 is directed towards an input on the first replicator 504. Due to a process of internal reflection between the two surfaces, and partial transmission of light from each of a plurality of output points on one of the surfaces (the upper surface, as shown in FIG. 5), which will be familiar to the skilled reader, light of the light beam 502 is replicated in a first direction, along the length of the first replicator 504. Thus, a first plurality of replica light beams 508 is emitted from the first replicator 504, towards the second replicator 506.

The second replicator 506 comprises a second pair of surfaces stacked parallel to one another, arranged to receive each of the collimated light beams of the first plurality of light beams 508 and further arranged to provide replication—or, pupil expansion—by expanding each of those light beams in a second direction, substantially orthogonal to the first direction. The first pair of surfaces are similarly (in some cases, identically) sized and shaped to one another and are substantially rectangular. The rectangular shape is implemented for the second replicator in order for it to have length along the first direction, in order to receive the first plurality of light beams 508, and to have length along the second, orthogonal direction, in order to provide replication in that second direction. Due to a process of internal reflection between the two surfaces, and partial transmission of light from each of a plurality of output points on one of the surfaces (the upper surface, as shown in FIG. 5), light of each light beam within the first plurality of light beams 508 is replicated in the second direction. Thus, a second plurality of light beams 510 is emitted from the second replicator 506, wherein the second plurality of light beams 510 comprises replicas of the input light beam 502 along each of the first direction and the second direction. Thus, the second plurality of light beams 510 may be regarded as comprising a two-dimensional grid, or array, of replica light beams.

Thus, it can be said that the first and second replicators 504, 505 of FIG. 5 combine to provide a two-dimensional replicator (or, "two-dimensional pupil expander").

Two-Dimensional Pupil Expansion—Example 2

British patent application GB2113454.9, filed 21 Sep. 2021 and incorporated herein by reference, discloses an image projector comprising a more advanced two-dimensional pupil expander may which be arranged in accordance with this disclosure.

The image projector may be arranged to project a diverging or diffracted light field. In some embodiments, the light field is encoded with a hologram. In some embodiments, the diffracted light field comprises diverging ray bundles. In some embodiments, the image formed by the diffracted light field is a virtual image.

In some embodiments, the first pair of parallel/complementary surfaces are elongate or elongated surfaces, being relatively long along a first dimension and relatively short along a second dimension, for example being relatively short along each of two other dimensions, with each dimension being substantially orthogonal to each of the respective others. The process of reflection/transmission of the light between/from the first pair of parallel surfaces is arranged to cause the light to propagate within the first waveguide pupil expander, with the general direction of light propagation being in the direction along which the first waveguide pupil expander is relatively long (i.e., in its "elongate" direction).

There is disclosed herein a system that forms an image using diffracted light and provides an eye-box size and field of view suitable for real-world application—e.g. in the automotive industry by way of a head-up display. The diffracted light is light forming a holographic reconstruction of the image from a diffractive structure—e.g. hologram such as a Fourier or Fresnel hologram. The use diffraction and a diffractive structure necessitates a display device with a high density of very small pixels (e.g. 1 micrometer)—which, in practice, means a small display device (e.g. 1 cm). The inventors have addressed a problem of how to provide 2D pupil expansion with a diffracted light field e.g. diffracted light comprising diverging (not collimated) ray bundles.

In some embodiments, the display system comprises a display device—such as a pixelated display device, for example a spatial light modulator (SLM) or Liquid Crystal on Silicon (LCoS) SLM—which is arranged to provide or form the diffracted or diverging light. In such aspects, the aperture of the spatial light modulator (SLM) is a limiting aperture of the system. That is, the aperture of the spatial light modulator—more specifically, the size of the area delimiting the array of light modulating pixels comprised within the SLM—determines the size (e.g. spatial extent) of the light ray bundle that can exit the system. In accordance with this disclosure, it is stated that the exit pupil of the system is expanded to reflect that the exit pupil of the system (that is limited by the small display device having a pixel size for light diffraction) is made larger or bigger or greater in spatial extend by the use of at least one pupil expander.

The diffracted or diverging light field may be said to have "a light field size", defined in a direction substantially orthogonal to a propagation direction of the light field. Because the light is diffracted/diverging, the light field size increases with propagation distance.

In some embodiments, the diffracted light field is spatially-modulated in accordance with a hologram. In other words, in such aspects, the diffractive light field comprises a "holographic light field". The hologram may be displayed on a pixelated display device. The hologram may be a computer-generated hologram (CGH). It may be a Fourier hologram or a Fresnel hologram or a point-cloud hologram or any other suitable type of hologram. The hologram may, optionally, be calculated so as to form channels of hologram light, with each channel corresponding to a different respective portion of an image that is intended to be viewed (or perceived, if it is a virtual image) by the viewer. The pixelated display device may be configured to display a plurality of different holograms, in succession or in sequence. Each of the aspects and embodiments disclosed herein may be applied to the display of multiple holograms.

The output port of the first waveguide pupil expander may be coupled to an input port of a second waveguide pupil expander. The second waveguide pupil expander may be arranged to guide the diffracted light field—including some of, preferably most of, preferably all of, the replicas of the light field that are output by the first waveguide pupil expander—from its input port to a respective output port by internal reflection between a third pair of parallel surfaces of the second waveguide pupil expander.

The first waveguide pupil expander may be arranged to provide pupil expansion, or replication, in a first direction and the second waveguide pupil expander may be arranged to provide pupil expansion, or replication, in a second, different direction. The second direction may be substantially orthogonal to the first direction. The second waveguide pupil expander may be arranged to preserve the pupil expansion that the first waveguide pupil expander has provided in the first direction and to expand (or, replicate) some of, preferably most of, preferably all of, the replicas that it receives from the first waveguide pupil expander in the second, different direction. The second waveguide pupil expander may be arranged to receive the light field directly or indirectly from the first waveguide pupil expander. One or more other elements may be provided along the propagation path of the light field between the first and second waveguide pupil expanders.

The first waveguide pupil expander may be substantially elongated and the second waveguide pupil expander may be substantially planar. The elongated shape of the first waveguide pupil expander may be defined by a length along a first dimension. The planar, or rectangular, shape of the second waveguide pupil expander may be defined by a length along a first dimension and a width, or breadth, along a second dimension substantially orthogonal to the first dimension. A size, or length, of the first waveguide pupil expander along its first dimension make correspond to the length or width of the second waveguide pupil expander along its first or second dimension, respectively. A first surface of the pair of parallel surfaces of the second waveguide pupil expander, which comprises its input port, may be shaped, sized, and/or located so as to correspond to an area defined by the output port on the first surface of the pair of parallel surfaces on the first waveguide pupil expander, such that the second waveguide pupil expander is arranged to receive each of the replicas output by the first waveguide pupil expander.

The first and second waveguide pupil expander may collectively provide pupil expansion in a first direction and in a second direction perpendicular to the first direction, optionally, wherein a plane containing the first and second directions is substantially parallel to a plane of the second waveguide pupil expander. In other words, the first and second dimensions that respectively define the length and breadth of the second waveguide pupil expander may be parallel to the first and second directions, respectively, (or to the second and first directions, respectively) in which the waveguide pupil expanders provide pupil expansion. The combination of the first waveguide pupil expander and the second waveguide pupil expander may be generally referred to as being a "pupil expander".

It may be said that the expansion/replication provided by the first and second waveguide expanders has the effect of expanding an exit pupil of the display system in each of two directions. An area defined by the expanded exit pupil may, in turn define an expanded eye-box area, from which the viewer can receive light of the input diffracted or diverging light field. The eye-box area may be said to be located on, or to define, a viewing plane.

The two directions in which the exit pupil is expanded may be coplanar with, or parallel to, the first and second directions in which the first and second waveguide pupil expanders provide replication/expansion. Alternatively, in arrangements that comprise other elements such as an optical combiner, for example the windscreen (or, windshield) of a vehicle, the exit pupil may be regarded as being an exit pupil from that other element, such as from the windscreen. In such arrangements, the exit pupil may be non-coplanar and non-parallel with the first and second directions in which the first and second waveguide pupil expanders provide replication/expansion. For example, the exit pupil may be substantially perpendicular to the first and second directions in which the first and second waveguide pupil expanders provide replication/expansion.

The viewing plane, and/or the eye-box area, may be non-coplanar or non-parallel to the first and second directions in which the first and second waveguide pupil expanders provide replication/expansion. For example, a viewing plane may be substantially perpendicular to the first and second directions in which the first and second waveguide pupil expanders provide replication/expansion.

In order to provide suitable launch conditions to achieve internal reflection within the first and second waveguide pupil expanders, an elongate dimension of the first waveguide pupil expander may be tilted relative to the first and second dimensions of the second waveguide pupil expander.

Combiner Shape Compensation

An advantage of projecting a hologram to the eye-box is that optical compensation can be encoded in the hologram (see, for example, European patent 2936252 incorporated herein by herein). The present disclosure is compatible with holograms that compensate for the complex curvature of an optical combiner used as part of the projection system. In some embodiments, the optical combiner is the windscreen of a vehicle. Full details of this approach are provided in European patent 2936252 and are not repeated here because the detailed features of those systems and methods are not essential to the new teaching of this disclosure herein and are merely exemplary of configurations that benefit from the teachings of the present disclosure.

Control Device

The present disclosure is also compatible with optical configurations that include a control device (e.g. light shuttering device) to control the delivery of light from a light channeling hologram to the viewer. The holographic projector may further comprise a control device arranged to control the delivery of angular channels to the eye-box position. British patent application GB2108456.1, filed 14 Jun. 2021 and incorporated herein by reference, discloses the at least one waveguide pupil expander and control device. The reader will understand from at least this prior disclosure that the optical configuration of the control device is fundamentally based upon the eye-box position of the user and is compatible with any hologram calculation method that achieves the light channeling described herein. It may be said that the control device is a light shuttering or aperturing device. The light shuttering device may comprise a 1D array of apertures or windows, wherein each aperture or window independently switchable between a light transmissive and a light non-transmissive state in order to control the delivery of hologram light channels, and their replicas, to the eye-box. Each aperture or window may comprise a plurality of liquid crystal cells or pixels.

A Projection Assembly for Increased Field of View

A conventional holographic display forms an image which is seen by a viewer at an eye-box of the holographic display. The maximum size of the image formable by the conventional holographic display, as seen by the viewer, (i.e. the field of view) is limited by diffraction. This is due to the angular spread of light from a diffractive structure, such as a hologram, being determined by (and therefore limited by) the pixel pitch of the display device of the holographic display. As such, it is challenging to provide the angular field of view and eye-box size demanded by industry (such as the heads-up display industry) using a conventional holographic arrangement. It may be beneficial to find ways and/or apparatuses to increase the FOV of holographic display devices to increase the size of the projected holographic image seen by the viewer. In the following, the FOV and eye-box are on substantially parallel planes and define first (x) and second (y) principal dimensions of the projection system, wherein the third dimension (z) is a propagation axis of the system. The first, second, and third dimensions are all perpendicular to each other.

Figures 6, 8A, 8B:
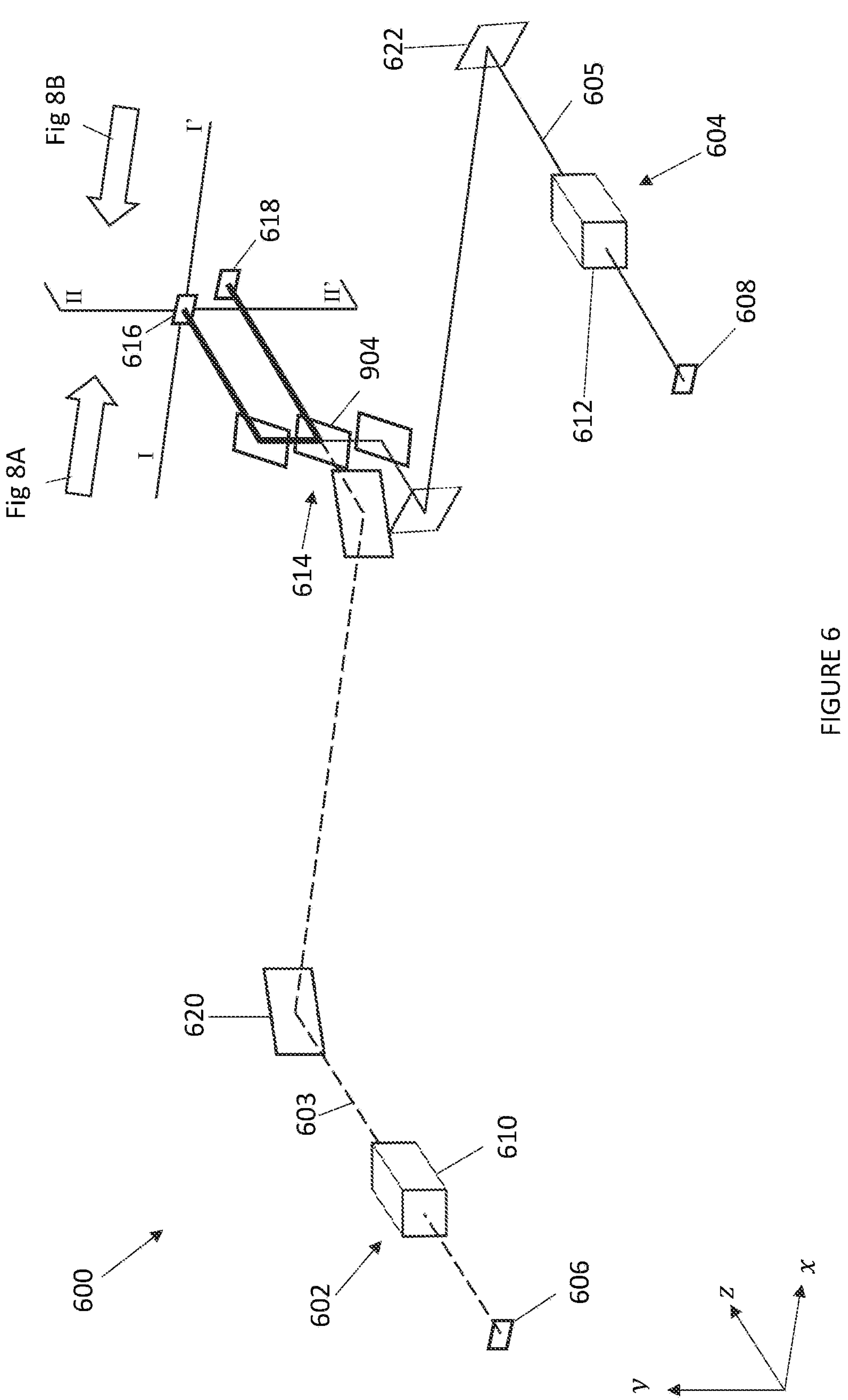
FIG. 6 shows a schematic illustration (not to scale) of a projection assembly.
FIG. 8A shows a schematic illustration (not to scale) of a first side view of the first and second outputs.
FIG. 8B shows a schematic illustration (not to scale) of a second side view opposite to the first side view of the first and second outputs.
Figure 8A:
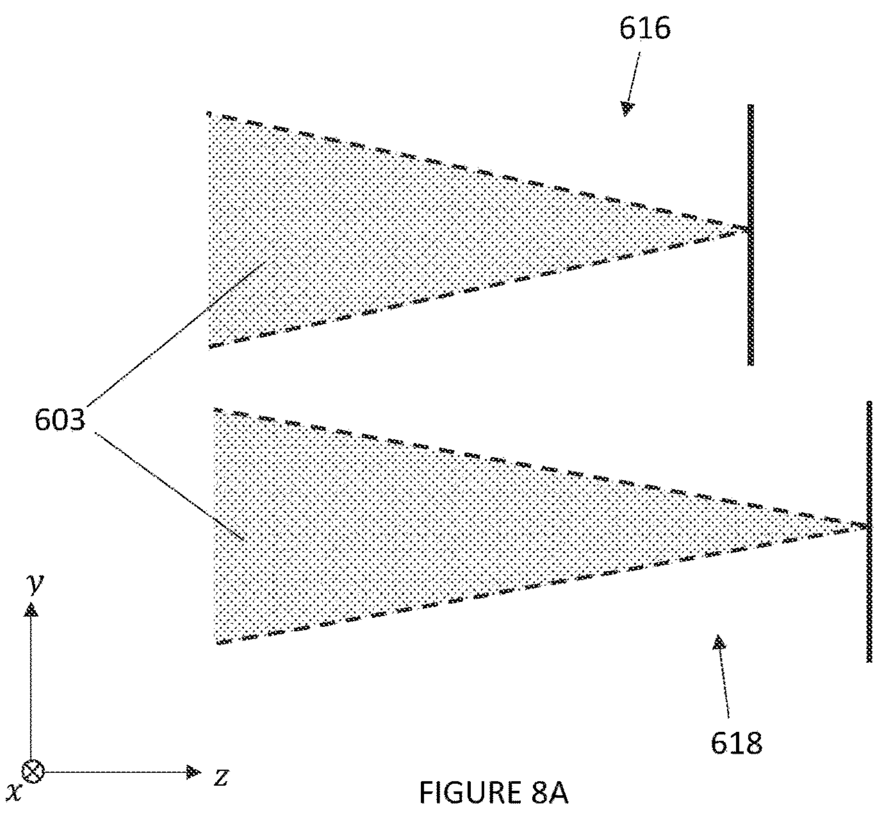
Figure 8B:
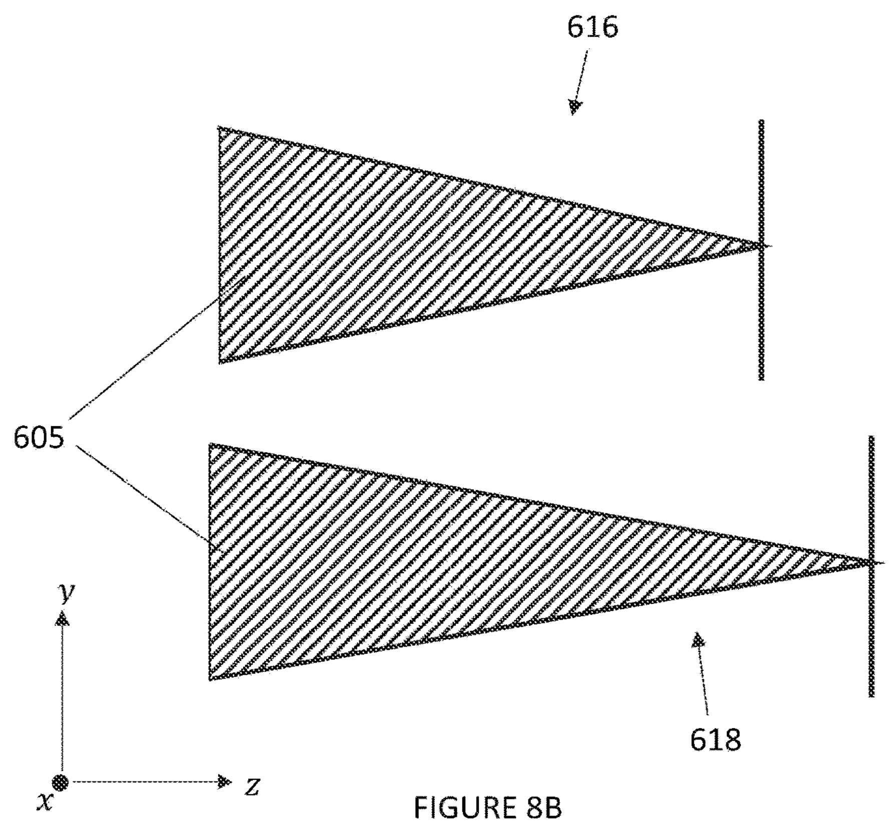

FIG. 6 depicts a schematic illustration (not to scale) of a projection assembly 600. The projection assembly 600 comprises a first holographic projection channel 602 and a second holographic projection channel 604. The first holographic projection channel 602 is configured to output a first holographic light field 603. The second holographic projection channel 604 is configured to output a second holographic light field 605. A holographic light field of a holographic projection channel may be considered to comprise all of the light rays that are being output by that holographic projection channel in 3D space at a particular time.

The first holographic projection channel 602 comprises a first display device 606 configured to display a first hologram corresponding to a first image. The first image may be the image seen by the viewer at an eye box of the projection assembly 600. The first display device 606 may be a SLM such as a LCOS. When the first display device 606 displaying the first hologram is illuminated with light from a first light source (not shown), the light from the first light source is spatially modulated in accordance with the displayed first hologram to form a holographic light field encoding the first image.

The first holographic projection channel 602 further comprises a first optical relay 610. The first optical relay 610 is configured to demagnify the holographic light field encoding the first image. The first optical relay 610 outputs a demagnified holographic light field encoding the first image which is the first holographic light field 603 outputted by the first holographic projection channel 602. The first optical relay 610 may be a demagnifying **4*f* system. In other embodiments without the first optical relay 610, the holographic light field encoding the first image is the first holographic light field 603**.

The second holographic projection channel 604 comprises a second display device 608 configured to display a second hologram corresponding to a second image. The second image may be the image seen by the viewer at a different eye box of the projection assembly. The second image may be the same as the first image. The second display device 608 may also be a SLM such as a LCOS. When the second display device 608 displaying the second hologram is illuminated with light from a second light source (not shown), the light from the second light source is spatially modulated in accordance with the displayed second hologram to form a holographic light field encoding the second image.

The second holographic projection channel 604 further comprises a second optical relay 612. The second optical relay 612 is configured to demagnify the holographic light field encoding the second image. The second optical relay 612 outputs a demagnified holographic light field encoding the second image which is the second holographic light field 605 outputted by the second holographic projection channel 604. The second optical relay 612 may be a demagnifying **4*f* system. In other embodiments without the second optical relay 612, the holographic light field encoding the second image is the second holographic light field 605**.

The angular content available from the holograms displayed on the first and second display devices 606, 608 is limited by the pixel size (e.g. a LCOS may have available content from an angular range of approximately −4° to +4°). The angular range may be increased by optically demagnifying the diffractive structures/holograms encoding the first and second images (e.g. using one or more optical relays such as the first and/or second optical relays 610, 612). This demagnification effectively reduces the size of the pixels that form the holographic light fields and therefore increases the diffraction angle. For example, if a diffractive structure (e.g. displayed on a LCOS) has a 12 mm dimension and approximately −4° to +4° angular range is demagnified by 2, then the corresponding demagnified diffractive structure has a 6 mm dimension and an angular range of approximately −8° to +8°. Importantly, to avoid ghosting in the image perceived by the viewer, the inventors have identified that it is strongly beneficial to have the demagnified dimension be no smaller than the human eye pupil diameter. Typically, the maximum human eye pupil diameter is 7 mm. If the diffractive structure/hologram in the first dimension (x) is less than 7 mm, then after replication in a waveguide/pupil expander in accordance with this disclosure, the inventors have found that the same region of the image may effectively be received through more than one replica and this can cause ghost images which significantly degrade the viewing experience. As such, if a diffractive structure/hologram is demagnified to increase the angular/diffraction range then the amount of demagnification used should be carefully limited—in accordance with the inventor's findings. In practice, the involvement of a windscreen in the projection of holographic images means that this direct correlation between eye pupil diameter and minimum dimension is not exact and, for example, the minimum dimension may be 5 mm in practice.

The projection assembly 600 further comprises a beam combiner 614 configured to adjoin/merge the first and second holographic light fields 603, 605. The beam combiner 614 comprises a beam splitter 902. The use of the beam combiner 614 results in a first output 616 and a second output 618. The second output 618 may be identical to the first output 616. Each of the first and second outputs 616, 618 is a multiplexed channel comprising the first holographic light field 603 adjoined/merged with the second holographic light field 605. Each of the first and second outputs 616, 618 has a larger continuous FOV than that of the first or second holographic light field 603, 605 individually, i.e. the image corresponding to the first or second output 616, 618, as seen by a viewer at the eye-box, extends continuously across an angular range that is larger than the angular range that the image corresponding to the first or second holographic light field extends across, as seen by the viewer at the eye box. The first and second outputs 616, 618 each may have a FOV substantially equal to the sum of the FOVs of the first and second holographic light fields 603, 605. In the context of the present application, adjoining light fields means that the light fields are positioned/orientated to propagate adjacent to each other and share a boundary with each other. The adjoined light fields may be considered to be contiguous. In other words, the volumes travelled by the adjoined propagating light fields are positioned adjacent to each other and abut each other. When the first holographic light field 603 has the same angular range/FOV as the second holographic light field 605, the first holographic projection channel 602 can be considered to be delivering a first half of the angular range of the FOV of the first and/or second output 616, 618 in the first dimension (x). Similarly, when the first holographic light field 603 has the same angular range/FOV as the second holographic light field 605, the second holographic projection channel 604 can be considered to be delivering a second half of the angular range of the FOV of the first and/or second output 616, 618 in the first dimension (x). The first and second outputs 616, 618 are described in more detail with respect to FIGS. 8A and 8B. The beam combiner 614 is explained in more detail with respect to FIGS. 9A to 9C.

In an example, each of the first and second holographic projection channels 602, 604 has a native emission of +/−4° in both the first and second dimensions (x, y). In this case, the first holographic projection channel 602 is arranged to deliver the first holographic light field 603 across the angular range −8° to 0° in the first dimension (x) and the angular range −4° to +4° in the second dimension (y). The second holographic projection channel 604 is arranged to deliver the second holographic light field 605 across the angular range 0° to +8° in the first dimension (x) and the angular range −4° to +4° in the second dimension (y). As such, a third holographic light field (i.e. the adjoined/merged first and second holographic light fields) has a FOV of −8° to +8° in the first dimension (x) and −4° to +4° in the second dimension (y). Therefore, an increase in FOV is achieved.

The projection assembly 600 may further comprise a first mirror 620 arranged to direct the first holographic light field 603 towards the beam combiner 614. The projection assembly 600 may further comprise a second mirror 622 arranged to direct the second holographic light field 605 towards the beam combiner 614. The projection assembly 600 may further comprise one or more output mirrors or other optical devices arranged to direct the first output 616 and the second output 618 to respective eye boxes.

Waveguides or pupil expanders can be additionally used to increase the angular content delivered to a viewer. Horizontal waveguides/pupil expanders are typically referred to as rods. Vertical waveguides/pupil expanders are typically referred to as slabs.

The first and second outputs 616, 618 are particularly useful when used as the inputs of multiple waveguides. For example, pupil expansion in the first dimension can be provided by a pair of elongated waveguides (e.g. rods). Each waveguide needs to receive both the first and second holographic light fields, otherwise the entire/combined FOV will not be visible from all eye-box positions. Such a pupil expansion system is described in GB2206791.2 filed 10 May 2022.

The light sources used to illuminate the first and second display devices 606, 608 may be different from each other. This tends to reduce or eliminate the occurrence of coherent interference between the propagating first and second holographic light fields 603, 605.

FIG. 7A depicts a schematic illustration (not to scale) of the first light ray bundles from the first display device 606 forming an image of the first display device 606'. FIG. 7B depicts a schematic illustration (not to scale) of the second light ray bundles from the second display device 608 forming an image of the second display device 608'.

The first display device 606 is tilted with respect to the second display device 608. In this arrangement, the respective axes of the holographic light fields encoding the first and second images are divergent (at least in the positions between the display devices and its respective optical relay). In other words, the holographic light fields from the first and second display devices 606, 608 initially propagate away from each other. The first display device 606 and second display device 608 are tilted/rotated with respect to each other about the second dimension (y). The first and second holographic light fields encoding the first and second images can be adjoined to or merged with one another in the first dimension (x).

The first display 606 is also tilted with respect to the propagation direction of the projection assembly 600, i.e. the third dimension (z), in a first direction. Each field point on the first display 606 forms a respective first light ray bundle that forms a corresponding image point on the image of the first display device 606'. Each of the first light ray bundles converges to a respective point on an image of the first display device 606'. The image of the first display device 606' can be the first hologram or the demagnified first hologram (if the optical relay has optical power). Each of the first light ray bundles propagates within a respective first volume 702 shown as the dotted volumes in FIG. 7A. Each of the first volumes 702 has a respective first boundary 704 that is substantially parallel to the third dimension (z).

The second display device 608 is also tilted with respect to the propagation direction of the projection assembly 600, i.e. the third dimension (z), in a second direction. The second direction is opposite to the first direction. Each field point on the second display device 608 forms a respective second light ray bundle that forms a corresponding image point on the image of the second display device 608'. Each of the second light ray bundles converges to a respective point on an image of the second display device 608'. The image of the second display device 608' can be the second hologram or the demagnified second hologram (if the optical relay has optical power). Each of the second light ray bundles propagates within a respective second volume 706 shown as the hatched volumes in FIG. 7B. Each of the second volumes 706 has a respective second boundary 708 that is substantially parallel to the third dimension (z).

FIG. 7C depicts a schematic illustration (not to scale) of a superposition of the images of the first and second display devices 606', 608' and examples of the light ray bundles that form each image. The image of the first display device 606' may be considered to be a first LCOS image. The image of the second display device 608' may be considered to be a second LCOS image. The first and second optical channels are arranged (e.g. using a beam combiner 614 discussed below in relation to FIG. 9) so that images of the first and second display devices 606', 608' are superpositioned with each other. This superposition of the images of the first and second display devices 606', 608' means that the first and second holographic light fields that propagate away from the LCOS images are combined. More specifically, since the first and second display devices 606, 608 (and therefore images of the first and second display devices 606', 608') are tilted with respect to each other in the way described above, the combining of the holographic light fields comprises merging, adjoining or stitching together. Such a merged holographic light field is formed from merged light ray bundles that each comprise a respective first light ray bundle on one side adjacent to/contiguous with a respective second light ray bundle on the opposite side. The first and/or second outputs 616, 618 may each comprise holographic light fields merged in such a way. The merged holographic light fields have different propagation directions because there is an angle, θ, between the image of the first display device 606' and the image of the second display device 608'. Moreover, first and second volumes 702, 706 share boundaries that are substantially parallel to the third dimension (z), i.e. the first boundaries 704 of first volume 702 that is substantially parallel to the third dimension (z) overlays the second boundaries 708 of second volume 706 that are substantially parallel to the third dimension (z). The tilt angle θ i.e. the angle between the images of the first and second display devices (e.g. the first and second LCOS images) 606', 608', is defined by the angular ranges of the images formed by the holographic light fields 603, 605. The tilt angle θ is the same as the angular ranges of the first and second images encoded in the holographic light fields. For the avoidance of doubt, the combined/merged holographic light field or wavefront (not shown in FIG. 7) that propagates away (in the positive z-direction) from each pair of superimposed LCOS images 606', 608' is adjoined in the same way as the light ray bundles (shown in FIG. 7) that form the LCOS images 606', 608'. That is, the merged holographic light field or wavefront that reaches the viewer comprises a first holographic light field (containing angular information of a first half of a field of view) adjoined to a second holographic light field (containing angular information of the second half of a field of view). Again, this is achievable owing to the unusual way the hologram divides the image content by angle in the hologram domain and the approach of delivering the image information to the viewer in hologram form (i.e. in the hologram domain). An increases in the image size (i.e. field of view) is effectively achieved by adding more angles in the hologram domain.

This is achieved with the second display device 608. The first and second display devices 606, 608 are tilted so as to perfectly stitch together two angular ranges. For the further avoidance of doubt, each output 616, 618 comprises a merged holographic light field as described herein.

FIG. 8A depicts a schematic illustration (not to scale) of a first side view of the first and second outputs 616, 618 output by the projection assembly 600 shown in FIG. 6 (as viewed from a left side of the projection assembly 600). FIG. 8B depicts a schematic illustration (not to scale) of a second side view opposite the first side view of the first and second outputs 616, 618 output by the projection assembly 600 shown in FIG. 6 (as viewed from a right side of the projection assembly 600). As the first and second outputs 616, 618 emerge from the beam combiner 614, they each comprise the first and second holographic light fields 603, 605 merged with one another in the first dimension (x). This means that from a first direction in first dimension (x), as seen in FIG. 8A, the outside portion of the first holographic light field 603 of the first and second outputs 616, 618 can be seen (shown by the dots in FIG. 8A). From a second direction (opposite to the first direction) in first dimension (x), as seen in FIG. 8B, the outside portion of the second holographic light field 605 of the first and second outputs 616, 618 can be seen (shown as the lines in FIG. 8B). The first and second outputs 616, 618 are offset with each other in both the third dimension (z) and the second dimension (y). The first and second outputs 616, 618 are orientated in the same way as each other in the first dimension (x). The first and second outputs 616, 618 are particularly useful when each is used as an input of a respective waveguide in a dual 1D-waveguide configuration (such as described in British patent application GB2206791.2 filed 10 May 2022 and incorporated herein in full by reference). In this way, the light that is usually lost or wasted from using a beam splitter is recycled or put to use.

Figure 9A:
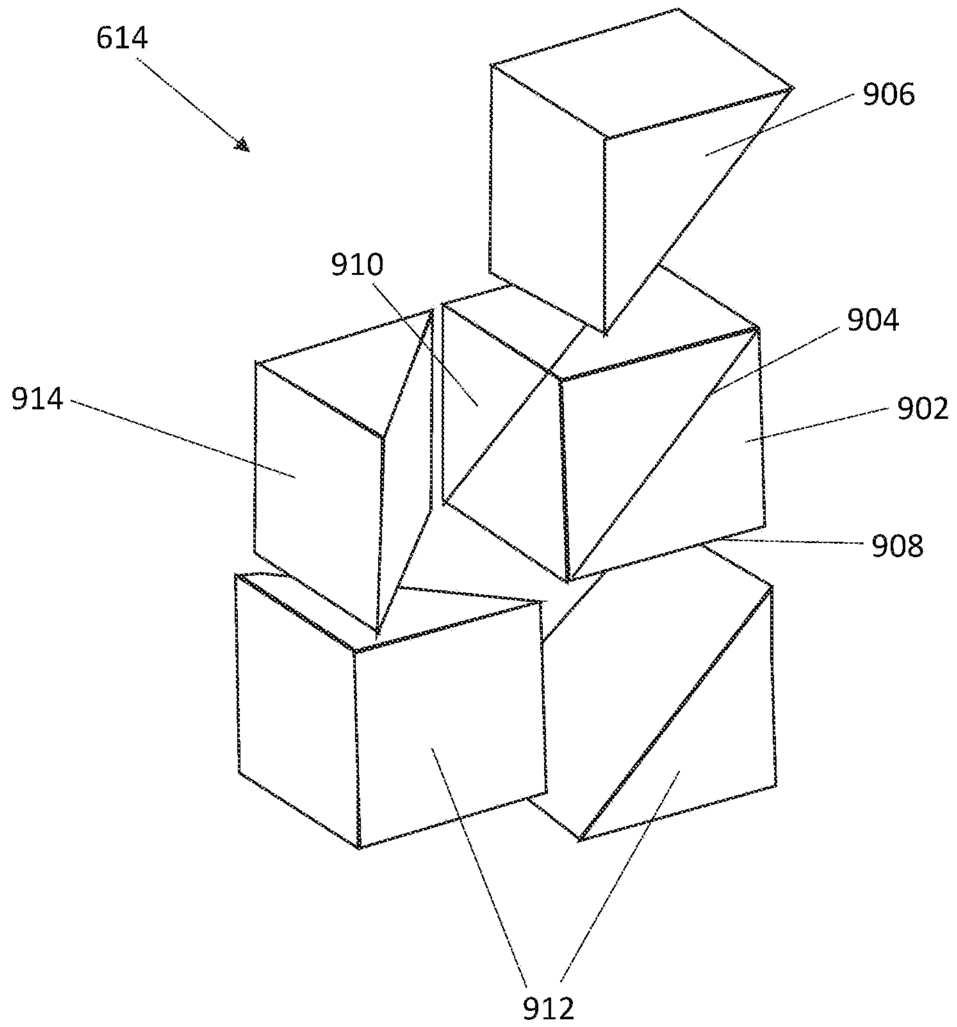
FIG. 9A shows a schematic illustration (not to scale) of the beam combiner.

FIG. 9A depicts a schematic illustration (not to scale) of the beam combiner 614 that adjoins/merges the first and second holographic light fields 603, 605. The beam combiner 614 comprises a beam splitter 902. The beam splitter 902 comprises a partially transmissive and partially reflective element 904. The partially transmissive and partially reflective element 904 may transmit 50% of the incident light and reflect 50% of the incident light. The beam combiner 614 further comprises an output mirror 906 positioned to direct/orientate first output 616 so that it is offset in the second and third dimensions (y, z) from second output 618 and orientated the same as the second output 618 in the first dimension (x). The beam combiner 614 may further comprise one or more first input mirrors 912 positioned to receive the first holographic light field 603 and redirect the first holographic light field 603 towards a first side 908 of the beam splitter 902. The beam combiner 614 may further comprise one or more second input mirrors 914 positioned to receive the second holographic light field 605 and redirect the second holographic light field 605 towards a second side 910 of the beam splitter 902. The first side 908 is different to the second side 910. The first side 908 is perpendicular to the second side 910. The element 904 is oriented at a 45° angle to the first side 908. The element 904 is also oriented at a 45° angle to the second side 910.

Figure 9B:
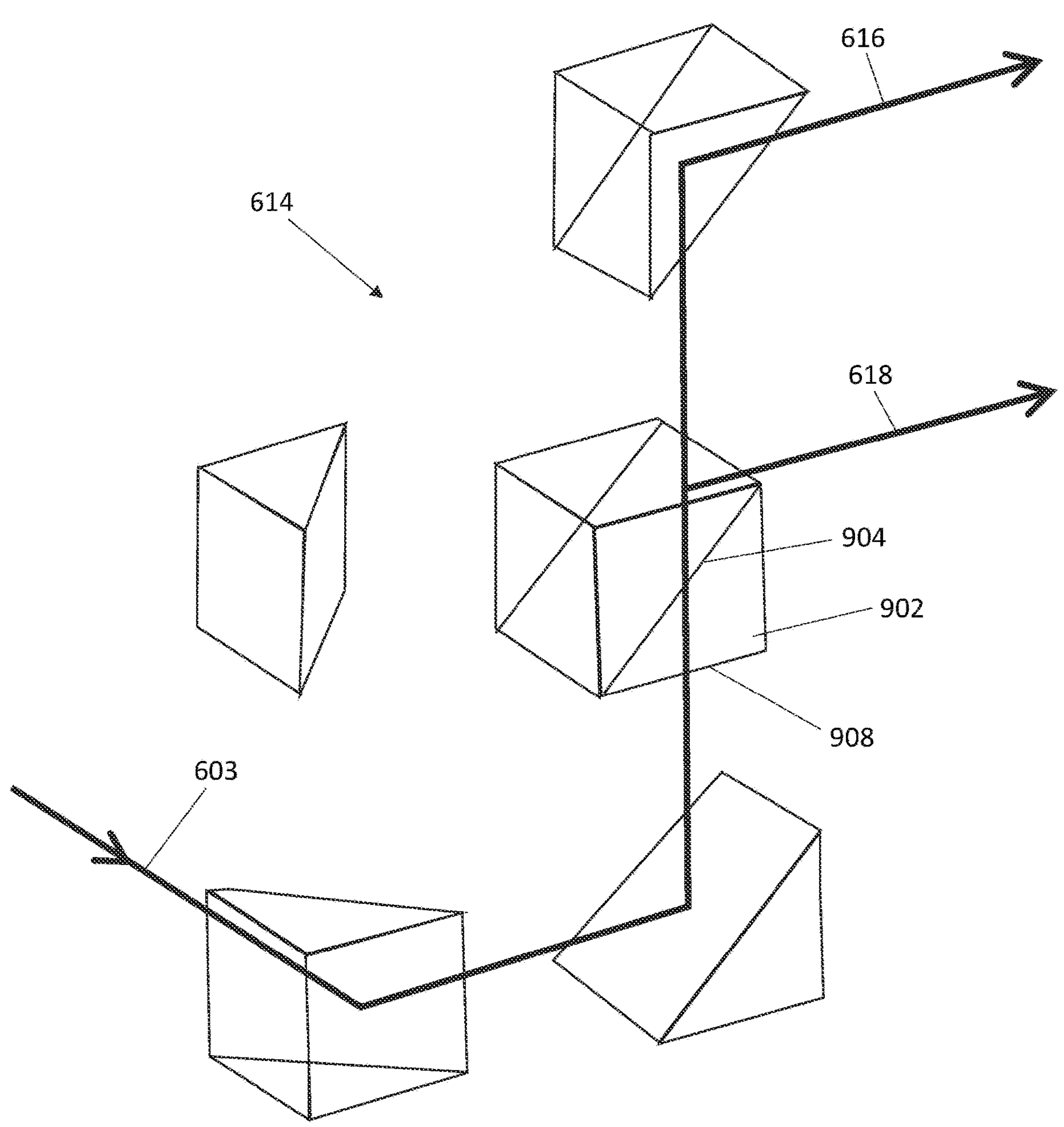
FIG. 9B shows a schematic illustration (not to scale) of the beam combiner having a first holographic light field propagating therethrough.

FIG. 9B depicts a schematic illustration (not to scale) of the beam combiner 614 having the first holographic light field 603 propagating therethrough. The first holographic light field 603 enters the beam splitter 902 on the first side 908 of the beam splitter 902. A portion, e.g. 50%, of the first holographic light field 603 is transmitted through the element 904. The transmitted portion then forms a part of the first output 616. The remaining portion, e.g. 50%, of the first holographic light field 603 is reflected by the element 904. The reflect portion then forms a part of the second output 618.

Figure 9C:
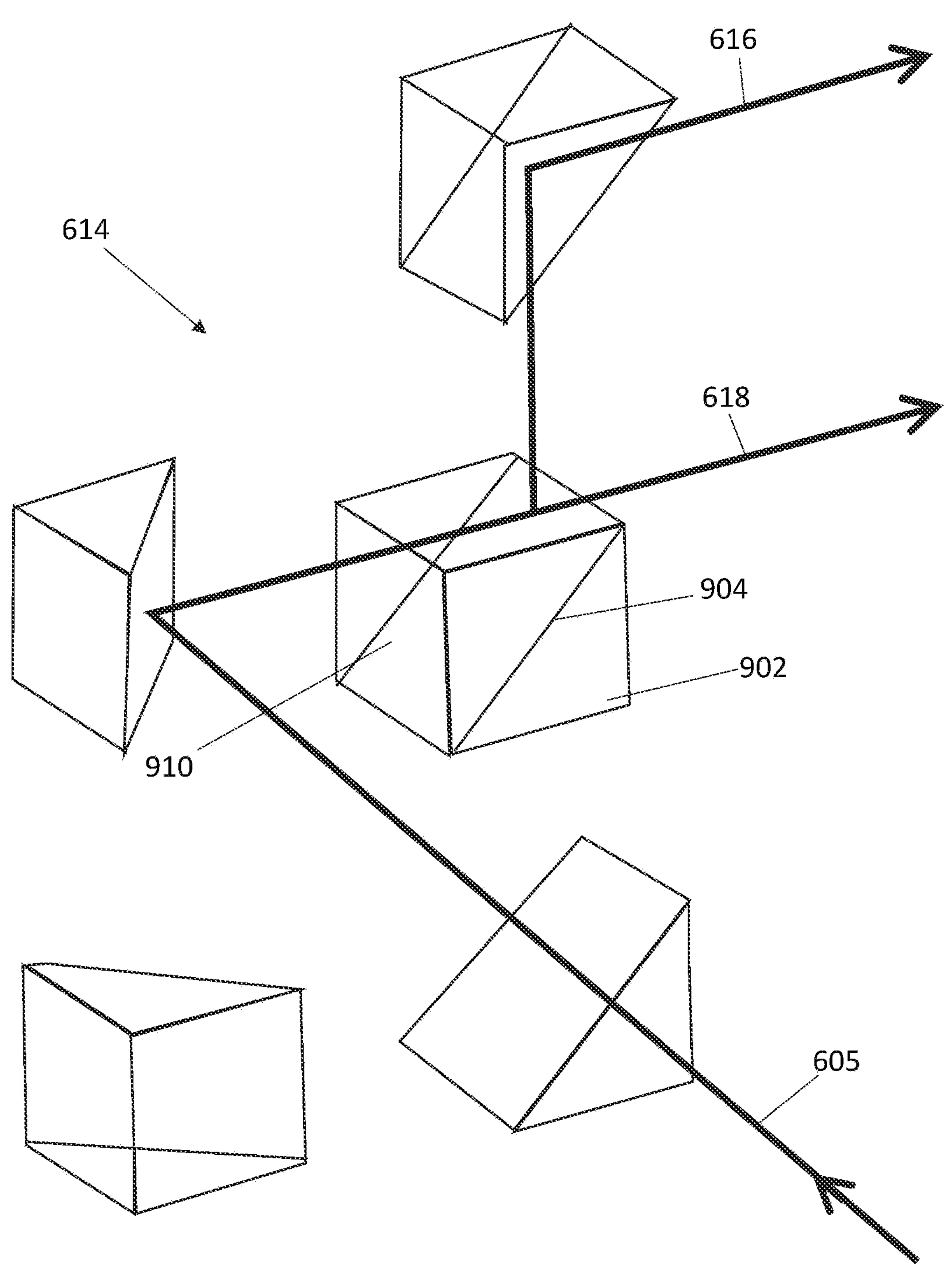
FIG. 9C shows a schematic illustration (not to scale) of the beam combiner having a second holographic light field propagating therethrough.

FIG. 9C depicts a schematic illustration (not to scale) of the beam combiner 614 having the second holographic light field 605 propagating therethrough. The second holographic light field 605 enters the beam splitter 902 on the second side 910 of the beam splitter 902. A portion, e.g. 50%, of the second holographic light field 605, is transmitted through the element 904. The transmitted portion then forms part of the second output 618. The remaining portion, e.g. 50%, of the second holographic light field 605 is reflected by the element 904. The reflected portion then forms part of the first output 616.

The transmitted portion of the first holographic light field 603 is merged with the reflected portion of the second holographic light field 605 thereby forming the first output 616. The reflected portion of the first holographic light field 603 is merged with the transmitted portion of the second holographic light field 605 thereby forming the second output 618.

The first and second holographic projection channels 602, 604 are arranged such that first and second holographic light fields 603, 605 are incident on the element 904 at the same position on the element 904. In other words, the footprint of the first and second holographic light fields 603, 605 on the element 904 are largely overlapping with each other. The first and second holographic light fields 603, 605 exiting the beam splitter are considered to be the first holographic light field 603 merged with the second holographic light field 605.

An example method of outputting the first holographic light field 603 merged with the second holographic light field 605 is provided in the following. The example method may comprise positioning the first and second holographic projection channels 602, 604 such that the first and second display devices 606, 608 titled with respect to each other with a predetermined angle θ therebetween. Subsequently, a beam splitter 902 may be positioned/arranged to receive the first holographic light field 603 on a first side 908 of the beam splitter 902 and to receive the second holographic light field 605 on a second side 910 of the beam splitter 902. The first and second holographic light fields 603, 605 are incident on a partially transmissive and partially reflective element 904 of the beam splitter 902 at the same position on the element 904. In this way, the transmitted portion of the first holographic light field 603 merges with the reflected portion of the second holographic light field 605. Similarly, the reflected portion of the first holographic light field 603 merges the transmitted portion of the second holographic light field 605. This would result in first and second outputs 616, 618 each comprising a portion of the first holographic light field 603 adjoined/merged with the second holographic light field 605, as described above.

Additional Features

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

What is claimed is:

1. A projection assembly comprising:

a first holographic projection channel configured to form a first holographic light field from a first hologram of a first image;

a second holographic projection channel configured to form a second holographic light field from a second hologram of a second image; and a beam combiner configured to receive the first holographic light field on a first side thereof and the second holographic light field on a second side thereof, wherein each hologram is configured to form a holographic light field in which content of a corresponding image in a first dimension is encoded by angle such that angular channels of holographic light each correspond to a respective slice of the corresponding image in the first dimension, and wherein the projection assembly is arranged to use the beam combiner to combine a first plurality of angular channels of the first holographic projection channel and a second plurality of angular channels of the second holographic projection channel in the first dimension in order that the first holographic light field and second holographic light field are co-receivable and transformable into an extended image comprising the first image adjoined to the second image, wherein the beam combiner comprises a beam splitter arranged to receive the first holographic light field on a first side thereof and the second holographic light field on a second side thereof, and wherein the beam splitter is configured to:

split the first holographic light field into a first transmitted light field and a first reflected light field;

split the second holographic light field into a second transmitted light field and a second reflected light field;

merge the first transmitted light field with the second reflected light field thereby forming a first multiplexed channel of two multiplexed channels; and merge the first reflected light field with the second transmitted light field thereby forming a second multiplexed channel of the two multiplexed channels, wherein the first and second multiplexed channels are identical to each other.

2. The projection assembly of claim 1, wherein:

the first holographic projection channel comprises a first display device configured to display the first hologram, wherein when the first display device is illuminated with a first light, the first light is spatially modulated in accordance with the displayed first hologram such that the first holographic projection channel forms the first holographic light field;

the second holographic projection channel comprises a second display device configured to display the second hologram, wherein when the second display device is illuminated with a second light, the second light is spatially modulated in accordance with the displayed second hologram such that the second holographic projection channel forms the second holographic light field; and the first display device and the second display device are tilted with respect to one another such that a first propagation direction of the first holographic light field diverges from a second propagation direction of the second holographic light field.

3. The projection assembly of claim 2, wherein the first display device and the second display device are tilted with respect to one another at a tilt angle that is substantially equal to a sum of diffraction angles of the adjoined first and second holographic light fields.

4. The projection assembly of claim 2, wherein the tilt is a rotation about a second dimension perpendicular to the first dimension such that the first and second holographic light fields are adjoined in the first dimension.

5. The projection assembly of claim 1, wherein an angular field of view of the projection assembly in the first dimension is equal to a sum of an angular field of view of the first holographic light field in the first dimension and an angular field of view of the second holographic light field in the first dimension.

6. The projection assembly of claim 5, wherein the angular field of view of the projection assembly in a second dimension is substantially equal to at least one of (i) the angular field of view of the first holographic light field in the second dimension or (ii) the angular field of view of the second holographic light field in the second dimension, and the second dimension is perpendicular to the first dimension.

7. The projection assembly of claim 1, wherein:

the first holographic projection channel comprises a first light source for forming the first holographic light field by illuminating the first hologram;

the second holographic projection channel comprises a second light source for forming the second holographic light field by illuminating the second hologram; and the first light source is different to the second light source.

8. The projection assembly of claim 1, wherein the projection assembly is arranged to use the beam combiner to form two multiplexed channels, each multiplex channel comprising a portion of the first holographic light field adjoined with a portion the second holographic light field.

9. The projection assembly of claim 8, wherein:

the multiplexed channels are substantially parallel and spatially offset in two perpendicular directions comprising a second dimension and a third dimension.

10. The projection assembly of claim 8, further comprising a plurality of waveguides, each waveguide being arranged to receive a respective one of the multiplexed channels.

11. The projection assembly of claim 10, wherein a first waveguide of the plurality of waveguides is configured to replicate light fields in a first direction and a second waveguide of the plurality of waveguides is configured to replicate light fields in a second direction opposite to the first direction.

12. The projection assembly of claim 1, wherein the first and second holographic projection channels each comprises a respective optical relay configured to form an intermediate image of the respective holographic light fields, wherein each optical relay changes a diffraction angle of the respective holographic light field.

13. The projection assembly of claim 12, wherein each intermediate image of the respective holographic light fields has a dimension greater than 5 mm.

* * * * *